United States Patent [19]

Schäfer et al.

[11] 4,095,908
[45] Jun. 20, 1978

[54] COUPLING UNIT

[75] Inventors: Horst-Dieter Schäfer, Willich; Paul Loosen, Krefeld; Ulrich Klören, Krefeld; Hans-Martin Thiele, Krefeld, all of Germany

[73] Assignee: Ringfeder G.m.b.H., Krefeld-Uerdingen, Germany

[21] Appl. No.: 773,841

[22] Filed: Mar. 2, 1977

[30] Foreign Application Priority Data

Mar. 5, 1976 Germany .............................. 2609042

[51] Int. Cl.² .............................................. F16D 1/06
[52] U.S. Cl. ........................................ 403/16; 403/370
[58] Field of Search ................. 403/16, 368, 369, 370, 403/371

[56] References Cited

U.S. PATENT DOCUMENTS

| 2,407,032 | 9/1946 | Myers | 403/370 X |
| 3,679,247 | 7/1972 | Peter | 403/366 |
| 3,958,888 | 5/1976 | Mullenberg | 403/370 X |
| 3,972,635 | 8/1976 | Peter | 403/13 |
| 3,990,804 | 11/1976 | Peter | 403/370 |

FOREIGN PATENT DOCUMENTS 6,503,082  9/1965  Netherlands .......................... 403/371

Primary Examiner—Andrew V. Kundrat
Attorney, Agent, or Firm—Michael J. Striker

[57] ABSTRACT

A coupling unit for coupling a shaft to a surrounding hub has an inner ring which surrounds the shaft and is in turn surrounded by an outer ring. The juxtaposed surfaces of the two rings define with one another two wedge-shaped annular gaps which taper towards each other axially of the rings. Tension members are inserted into these gaps and both extend through the tension members so as to draw them axially together in order to force the rings against the shaft and the hub, respectively. An abutment ring is located between the inner and outer rings and has circumferentially spaced bores some of which are smooth and some of which are tapped. By cooperation of the bolts and the abutment ring the tension members can be forced out of the respective gaps when the connection between shaft and hub is to be released.

7 Claims, 3 Drawing Figures

COUPLING UNIT

BACKGROUND OF THE INVENTION

This invention relates to a coupling unit, and more particularly to a unit for coupling a shaft to a surrounding hub for joint movement.

It is known to provide arrangements which couple a shaft to a hub through which the shaft extends, so that they can perform joint movements, for example joint rotation. Such arrangements have an inner ring which is placed about the shaft and an outer ring which is placed about the inner ring. The juxtaposed surfaces of the two rings define with one another annular gaps which taper in mutually opposite directions towards one another. Similarly tapering tensioning members are inserted into these gaps and drawn inwardly towards one another by bolts, so as to cause the inner and outer rings to be forced against the shaft and the hub, respectively.

Difficulties are experienced in some of these constructions when the arrangement is subsequently to be released again, i.e. when the tension members must be made to move outwardly of their associated gaps.

German patent No. 1,099,806 discloses an arrangement of the type in question where the wedge angles of the gaps and tension members are so selected that when the bolts are released and no longer draw the tension members together, the tension members generally tend to automatically move outwardly of their associated gaps. However, in the event of improper operation of the arrangement (e.g. by unskilled personnel) difficulties in the desired release may be experienced even with this construction.

Moreover, there are other constructions in which the wedge angles of the gaps and tension elements are chosen to be within the self-locking range, i.e. when the bolts are released the tension members remain in their positions. To avoid the need for special "pulling-off" devices in such cases, coupling arrangements have been proposed in German "Gebrauchsmuster" 7,208,307 and 7,217,467 which are to facilitate the removal (i.e. expulsion) of the tension members. However, for reasons which are evident to those conversant with the field, these proposals are not truly satisfactory.

SUMMARY OF THE INVENTION

It is an object of the invention to provide a coupling unit or coupling arrangement of the type under discussion, which avoids disadvantages found in the prior art.

More particularly, it is an object of the invention to provide such an arrangement wherein the expulsion of the tension members is facilitated.

Another objects of the invention is to provide an arrangement of this kind wherein the expulsion of the tension members can, if necessary, be effected by applying high expulsion forces.

Still a further object of the invention is to provide such an arrangement as outlined above which is of simple construction.

A concomitant object is to provide such an arrangement which can be installed and removed without requiring expanding or contracting of the rings for installation purposes, and which offers improved coupling characteristics.

In pursuance of these objects and of others which will become apparent hereafter, one feature of the invention resides in an arrangement for coupling a shaft with a surrounding hub. Briefly stated, this arrangement may comprise an inner annular member surrounding the shaft and having an outer circumferential face including two first sections which taper coaxially in mutually opposite axial directions of the inner member, an outer annular member having an inner circumferential face surrounding the outer circumferential face with clearance and having two second sections each having a taper and each forming with one of the first sections a wedge-shaped annular clearance, tensioning members received in the respective wedge-shaped clearances, first means for drawing the tensioning members inwardly of the respective wedge-shaped clearance to thereby force the inner member against the shaft and the outer member against the hub, and second means coacting with the first means and operative for dislodging the tensioning members from the wedge-shaped clearances when desired.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a section analogous to the one in FIG. 1 and taken through the same arrangement but at a location which is circumferentially spaced from the section line on which FIG. 1 is taken.

DESCRIPTION OF A PREFERRED EMBODIMENT

Figure 1:
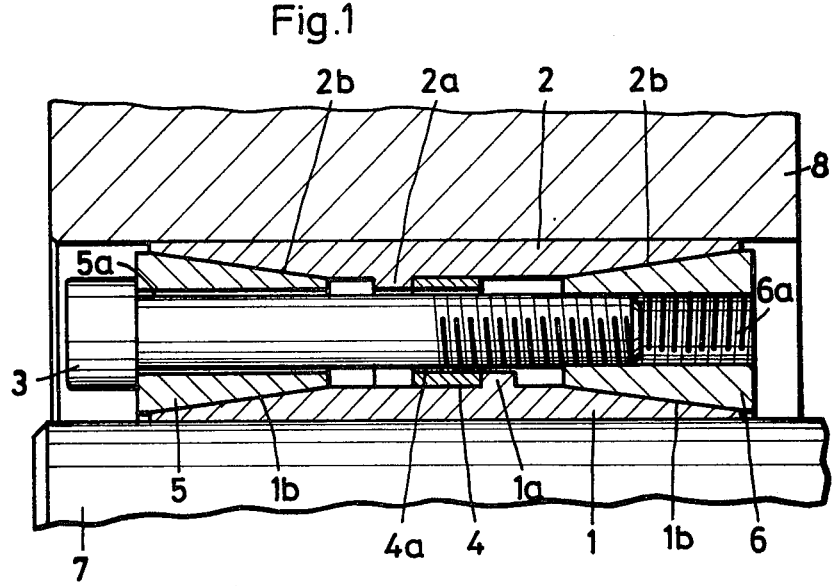
FIG. 1 is a fragmentary axial section through an arrangement according to the present invention, in installed condition.
Figure 2:
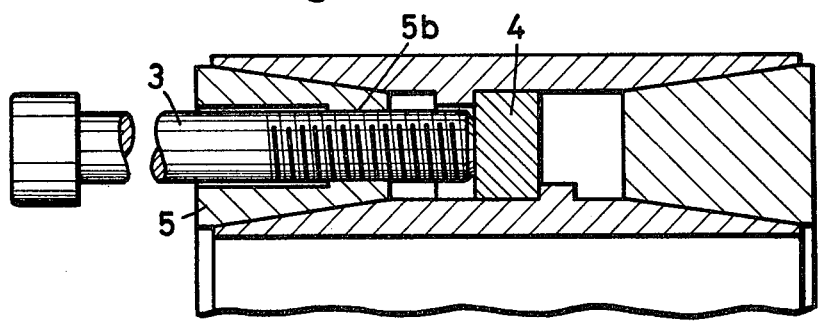
Figure 3:
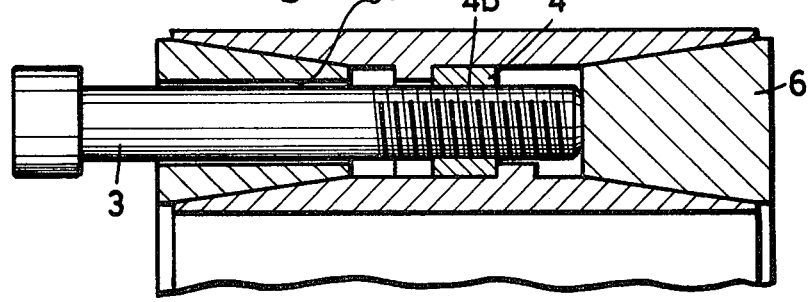
FIG. 3 is a view similar to FIG. 2, but again taken on a section line which is circumferentially spaced from the section lines of FIGS. 1 and 2.

A single embodiment of the invention is shown by way of example in FIGS. 1-3. It will be seen that a hub 8 (of whatever shape desired) surrounds a shaft 7 with clearance. The two are to be coupled together for joint movement, e.g. for joint rotation, reciprocation or the like.

An arrangement according to the invention effects this coupling-together of shaft 7 and hub 8. It has an inner annular member 1 which surrounds the shaft 7 and an outer annular member 2 which surrounds the member 1 with radial clearance. The inner surface of member 1 is to frictionally engage the shaft 7; the outer surface of member 2 is to similarly engage the inner circumferential surface bounding the bore in hub 8.

It should be understood that the members 1 and 2 are annular, i.e. although not so shown in the drawing they are ring-shaped. They will usually be circumferentially complete but may in some instances be provided with an axial slot, as will be later described.

The outer circumferential surface of member 1 has two axially spaced sections 1*b*, 1*b* which taper axially towards each other at a core-angle or wedge-angle as shown. Similarly, the inner circumferential surface of member 2 is provided with two axially spaced sections 2*b*, 2*b* which also taper axially towards each other at respective core-angles. As shown, each of the sections 2*b* forms with one of the sections 1*b* an annular gap or clearance which is of wedge-shaped cross-section; the two gaps taper axially inwardly towards each other.

Tension members, in the illustrated embodiment configurated as circumferentially complete (they could also be provided with respective axial slots) tension rings 5, 6 are received in the respective gaps. The cross-sections of the rings 5, 6 are wedge-shaped and the cone-angles of the rings and the gaps are so selected as to be self-locking; i.e. once drawn into the gaps the rings do not have an inherent tendency to move outwardly. To remove them, the rings 5, 6 must be forcibly expelled from their associated gaps.

The rings 5, 6 are provided with circumferentially spaced bores. Ring 5 has bores 5a which are smooth and through which respective tensioning bolts 3 are pushed. Ring 6 has tapped bores 6a into which the bolts 3 are threaded. Thus, turning of the bolts 3 in a sense threading them deeper into the bores 6a causes the rings 5, 6 to be pulled towards each other, i.e. inwardly of their associated gaps. This, in turn, causes the member 1 to be forced into tight engagement with the shaft 7 and the member 2 to be forced into tight engagement with the hub 8.

When the bolts 3 are later released, e.g. for inspection or repair of components of the arrangement or simply because shaft 7 and hub 8 are to be uncoupled, the members 5, 6 remain in their positions. To disengage members 1 and 2 from shaft 7 and hub 8, respectively, it is necessary to forcibly expel the members 5, 6 from their respective gaps.

To achieve this in a simple and reliable manner the invention provides the abutment ring 4 which is located in the space between the outer and inner surfaces of members 1 and 2. In order to prevent axial shifting of ring 4 the inner surface of member 1 is provided with abutment means; in the illustrated example this is in form of a circumferential collar 1a forming a shoulder which abuts against one axial end of ring 4. Similar abutment means, here in form of a circumferential collar 2a forming a shoulder which abuts the opposite axial end of ring 4, are provided on the inner surface of member 2. While it is currently preferred that the axial distance between the two shoulders correspond to the axial length of ring 4, it is conceivable that in some embodiments some slight play of ring 4 relative to these shoulders might be acceptable.

Ring 4 has a series of circumferentially spaced through-going holes, i.e. holes which extend from one to the other of its axial ends. These include smooth holes 4a through which the bolts 3 can freely pass when the arrangement is being assembled and put in use, i.e. in the condition of FIG. 1.

Some of the holes in ring 4 are, however, tapped and these are identified with reference numeral 4b (FIG. 3); they are interspersed between the holes 4a. For example, two circumferentially successive holes 4a may be followed in circumferential direction by a tapped hole 4b, and so on.

Similarly, the annular member 5 has not only the smooth bores 5a but, circumferentially interspersed among these, a series of tapped bores 5b (FIG. 2).

When the member 5 is to be expelled from its gap, the bolts 3 are first all released. Thereupon, some of the bolts 3 are threaded through respective ones of the tapped bores 5b; since these are located opposite non-apertured portions of the ring 4, the leading ends of the bolts 3 abut these portions and upon requisite threading-in of the bolts 5 in the bores 5b the member 5 is subjected to sufficient force to expel it from the gap (FIG. 2).

To similarly expel the member 6, some of the withdrawn bolts 3 are pushed through smooth bores 5c of the member 5 (which are also circumferentially interspersed among the bores 5a and 5b) and threaded through the bores 4b which are located opposite them, until the leading ends of these bolts abut non-apertured portions (i.e. portions between the bores 6a) of the member 6. Further threading-in of these bolts then exerts pressure upon member 6 and expels the same from the associated gap (FIG. 3).

The ring 4 thus serves as an abutment for the bolts 3, irrespective of whether the number 5 or the member 6 is being expelled. No extraneous "pulling-off" device is required for this expulsion and the ring 4 and the strongly dimensioned collars 1a and 2a are able to withstand very high expelling forces. Since the members 1 and 2 remain free to slide axially with reference to the shaft 7 and hub 8, no problems are experienced in installing and removing the arrangement. This makes it possible to use circumferentially complete members 1, 2 since no radial expansion is required for installation; if axial slots are provided, i.e. if the circumferential continuity is interrupted at one location, the slots can have a very small circumferential width. Due to these factors the novel arrangement assures very uniform surface-to-surface contact and pressure-transmission relative to shaft 7 and hub 8 and this is reflected in improved coupling characteristics. The fact that the collars 1a, 2a need have only small radial height makes it easy to manufacture the members 1 and 2 from stock material by turning and other material-removing methods.

If it is desired that the members 1, 2 not be circumferentially complete but that they should each have an axial slot extending from one to the other axial end of the respective member, then it is advantageous for the members 1, 2 to have identical cross-sectional configurations or profiles. They can then be made of appropriately profiled bar stock and need merely be installed in mirror-reversed sense. Here, again, the low radial height of the collars 1a, 2a is of advantage because it facilitates the rolling-up of the bar stock to the required annular configurations.

While the invention has been illustrated and described as embodied in a coupling unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for coupling a shaft with a surrounding hub, comprising an inner annular member surrounding said shaft and having an outer circumferential face including two first sections which taper coaxially in mutually opposite axial directions of said inner member; an outer annular member having two axial ends and an inner circumferential face surrounding said outer circumferential face with clearance and having two second sections each having a taper and each forming with one of said first sections a wedge-shaped annular clearance; tensioning members received in the respective wedge-shaped clearances; first means for drawing said tensioning members inwardly of the respective wedge-shaped clearance to thereby force said inner member against the shaft and said outer member against the hub; and second means coacting with said first means and operative for dislodging said tensioning members from said wedge-shaped clearance when desired, by applying an axially acting force from one and the same axial end irrespective of which one of said tensioning members is to be dislodged, and said second means comprising an abutment ring and a pair of axially spaced abutments each provided on one of said outer and inner circumferential faces, respectively, and confining said abutment ring between them and each preventing movement of said abutment ring in one axial direction while the respective outer and inner faces allow such movement in the opposite axial direction.

2. An arrangement as defined in claim 1, wherein said first means comprises tensioning bolts extending through one and threaded into the other of said tensioning members.

3. An arrangement as defined in claim 2, wherein said abutment ring is provided with a plurality of circumferentially spaced bores extending from one to the other axial end of said ring, some of said bores being smooth bores through which the respective bolts can freely extend and others of said bores being tapped bores through which the respective bolts can be threaded.

4. An arrangement as defined in claim 1, wherein said abutments are annular shoulders formed on the respective faces.

5. An arrangement as defined in claim 1, wherein said abutments are spaced from one another in axial direction of said inner and outer members by a distance corresponding to the axial length of said abutment ring.

6. An arrangement as defined in claim 1, wherein said inner and outer annular members are each provided with an axial slot.

7. An arrangement as defined in claim 6, wherein said inner and outer annular members have identical but mirror-reversed cross-sectional profiles.

* * * * *